(12) United States Patent
Diemer et al.

(10) Patent No.: US 8,905,850 B2
(45) Date of Patent: Dec. 9, 2014

(54) TRANSMISSION FOR A VEHICLE AND A SHAFT ASSEMBLY FOR TRANSFERRING A FLUID IN THE TRANSMISSION OF THE VEHICLE

(75) Inventors: John A. Diemer, Farmington Hills, MI (US); Mindy L. Barth, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 49 days.

(21) Appl. No.: 13/543,038

(22) Filed: Jul. 6, 2012

(65) Prior Publication Data

US 2014/0011600 A1 Jan. 9, 2014

(51) Int. Cl.
*F16C 1/24* (2006.01)
*F16C 3/02* (2006.01)

(52) U.S. Cl.
USPC .............................................. 464/7; 464/178

(58) Field of Classification Search
CPC ............ B60B 27/0005; F16C 33/6677; F16H 57/042; F16H 57/0421; F16H 57/0424; F16H 57/0426; F16H 57/043
USPC ......... 464/7, 178; 475/159; 184/6.12, 6.8, 7.1
See application file for complete search history.

(56) References Cited

U.S. PATENT DOCUMENTS

| | | | | |
|---|---|---|---|---|
| 1,862,099 A * | 6/1932 | Sheldrick | | |
| 3,677,525 A * | 7/1972 | Schurig et al. | | |
| 3,913,846 A * | 10/1975 | Morris | | |
| 4,987,974 A * | 1/1991 | Crouch | ........................ | 184/6.12 |
| 5,025,683 A * | 6/1991 | Lewis | | |
| 5,667,036 A * | 9/1997 | Mueller et al. | ............... | 184/6.12 |
| 6,293,784 B1 * | 9/2001 | Griffioen | | |
| 6,322,452 B1 * | 11/2001 | Kondo | .......................... | 464/178 |
| 8,177,648 B2 * | 5/2012 | Gooden et al. | .................... | 464/7 |

* cited by examiner

*Primary Examiner* — Gregory Binda
*Assistant Examiner* — Josh Skroupa
(74) *Attorney, Agent, or Firm* — Quinn Law Group, PLLC

(57) ABSTRACT

A transmission for a vehicle and a shaft assembly for transferring a fluid in the transmission of the vehicle are disclosed. The shaft assembly includes an input member rotatable about a longitudinal axis. The input member defines a cavity along the longitudinal axis. The shaft assembly further includes a shaft rotatable about the longitudinal axis and extending to a first end facing the input member. The shaft and the input member are spaced from each other along the longitudinal axis to define a gap therebetween. The shaft assembly also includes a cap attached to the shaft, with the cap extending through the gap into the cavity of the input member. The cap defines an aperture in fluid communication with the cavity for delivering the fluid from the shaft to the cavity of the input member.

20 Claims, 2 Drawing Sheets

TRANSMISSION FOR A VEHICLE AND A SHAFT ASSEMBLY FOR TRANSFERRING A FLUID IN THE TRANSMISSION OF THE VEHICLE

TECHNICAL FIELD

The present disclosure relates to a transmission for a vehicle including an engine, with the transmission configured to transfer a fluid, and a shaft assembly for transferring the fluid in the transmission.

BACKGROUND

There are various types of transmissions utilized in vehicles. One type of transmission can include an input shaft coupled to an engine of a vehicle. The input shaft is rotatable about a central axis. An output shaft cooperates with the input shaft and is also rotatable about the central axis. Specifically, the input shaft is disposed in the output shaft, with a seal disposed between the input and output shafts for preventing fluid from leaking therebetween. The seal can create friction between the input and output shafts as the shafts rotate which can cause spinloss of the input and output shafts.

SUMMARY

The present disclosure provides a shaft assembly for transferring a fluid in a transmission of a vehicle. The shaft assembly includes an input member rotatable about a longitudinal axis. The input member defines a cavity along the longitudinal axis. The shaft assembly further includes a shaft rotatable about the longitudinal axis and extending to a first end facing the input member. The shaft and the input member are spaced from each other along the longitudinal axis to define a gap therebetween. The shaft assembly also includes a cap attached to the shaft, with the cap extending through the gap into the cavity of the input member. The cap defines an aperture in fluid communication with the cavity for delivering the fluid from the shaft to the cavity of the input member.

The present disclosure also provides a transmission for a vehicle including an engine, with the transmission configured to transfer a fluid. The transmission includes a housing and an input member partially disposed inside the housing. The input member is adapted to be coupled to the engine. The input member is rotatable about a longitudinal axis and defines a cavity along the longitudinal axis. The transmission further includes a shaft disposed inside the housing and rotatable about the longitudinal axis. The shaft extends to a first end facing the input member. The shaft and the input member are spaced from each other along the longitudinal axis to define a gap therebetween. The transmission also includes a cap attached to the shaft, with the cap extending through the gap into the cavity of the input member. The cap defines an aperture in fluid communication with the cavity for delivering the fluid from the shaft to the cavity of the input member.

The present disclosure further provides a transmission for a vehicle including an engine, with the transmission configured to transfer a fluid. The transmission includes a housing and an input member partially disposed inside the housing. The input member is adapted to be coupled to the engine. The input member is rotatable about a longitudinal axis. The input member presents a face transverse to the longitudinal axis and defines a cavity along the longitudinal axis to present an inner surface disposed radially relative to the longitudinal axis and a base disposed transverse to the longitudinal axis. The transmission further includes a shaft disposed inside the housing and rotatable about the longitudinal axis. The shaft extends to a first end transverse to the longitudinal axis such that the first end faces the face in a spaced relationship to define a gap therebetween. The shaft defines a channel along the longitudinal axis to present an inner wall disposed radially relative to the longitudinal axis. The transmission also includes a cap attached to the inner wall of the shaft such that the cap and the shaft commonly rotate about the longitudinal axis. The cap includes a projection extending outwardly away from the shaft through the gap into the cavity of the input member to a distal end transverse to the longitudinal axis. The distal end defines an aperture in fluid communication with the channel of the shaft and the cavity of the input member for delivering the fluid from the channel to the cavity. The first end of the shaft and the distal end of the projection are substantially parallel to each other. The projection extends through the gap into the cavity a first length along the longitudinal axis. The first length is defined between the first end of the shaft and the distal end of the projection for delivering the fluid from the channel of the shaft to the inner surface of the cavity. The face of the input member and the distal end of the projection are substantially parallel to each other. The projection overlaps the input member a second length along the longitudinal axis. The second length is defined between the face of the input member and the distal end of the projection for delivering the fluid to the inner surface of the cavity, with the first length greater than the second length.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
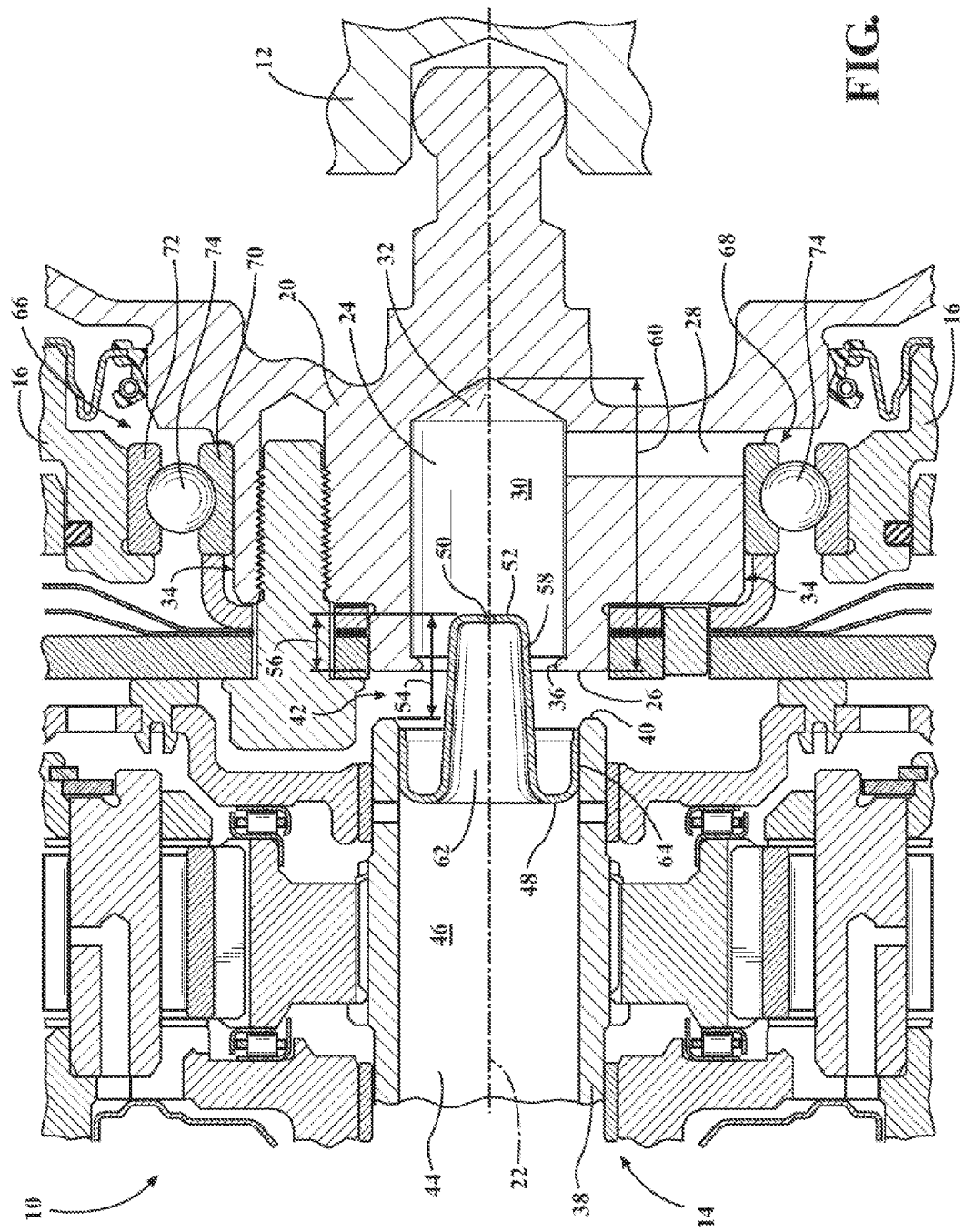
FIG. 1 is a schematic cross-sectional view of a transmission and a shaft assembly.

Referring to the Figures, wherein like numerals indicate like or corresponding parts throughout the several views, a transmission 10 for a vehicle including an engine 12 is generally shown in FIG. 1. The transmission 10 is configured to transfer a fluid. In particular, a shaft assembly 14 for transferring the fluid in the transmission 10 of the vehicle is generally shown in FIG. 1. Therefore, in certain embodiments, the transmission 10 includes the shaft assembly 14. It is to be appreciated that the engine 12 is shown schematically in FIG. 1.

The shaft assembly 14 can be utilized in a hybrid vehicle transmission 10. The hybrid vehicle transmission 10 can include a first motor/generator and a second motor/generator as known to those skilled in the art. In various embodiments, the first and second motors can be electric motors. It is to be appreciated that the transmission 10 can include other components not specifically discussed herein. It is to also be appreciated that the shaft assembly 14 can be utilized in a transmission other than a hybrid vehicle transmission 10.

Referring to FIG. 1, the transmission 10 includes a housing 16. Generally, the shaft assembly 14 is disposed inside the housing 16. In certain embodiments, the housing 16 is coupled to the engine 12.

The shaft assembly 14 includes an input member 20 rotatable about a longitudinal axis 22. The input member 20 is partially disposed inside the housing 16 and adapted to be coupled to the engine 12. In other words, a portion of the input member 20 is disposed inside the housing 16 and another portion of the input member 20 is disposed outside of the housing 16. Generally, the portion of the input member 20 disposed outside of the housing 16 is coupled to the engine 12.

Figure 2:
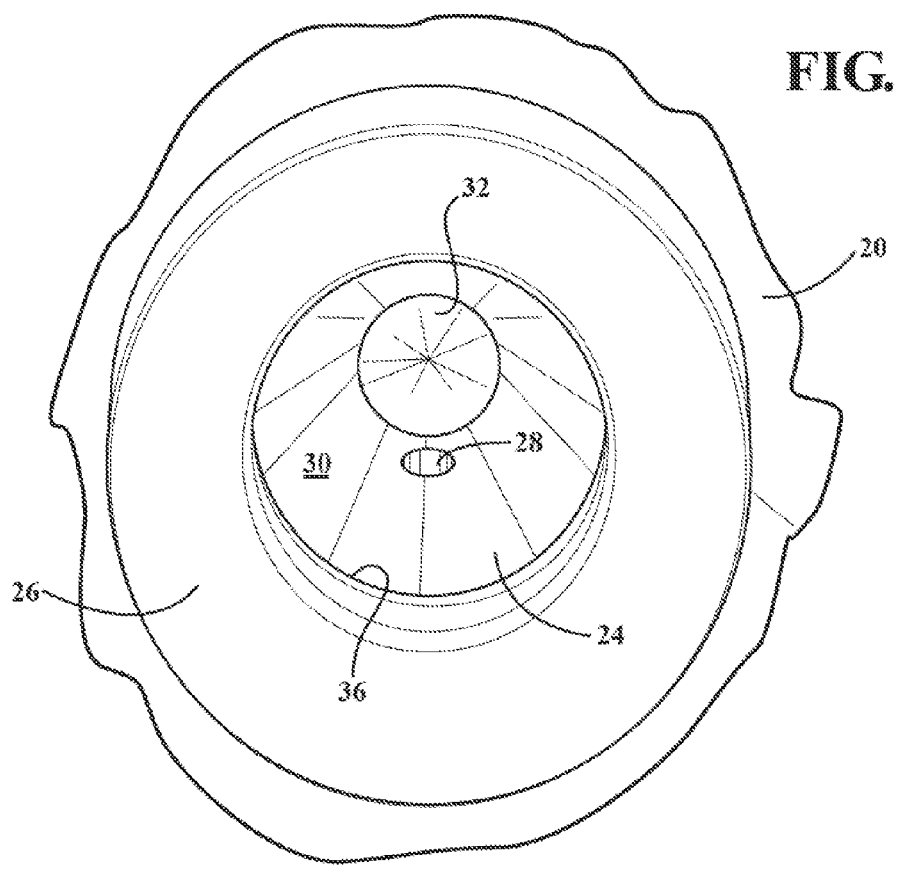
FIG. 2 is a schematic perspective view of an input member.

Also referring to FIG. 2, the input member 20 defines a cavity 24 along the longitudinal axis 22, with the cavity 24 receiving the fluid. In certain embodiments, the fluid is a lubricant. In one embodiment, the lubricant is oil. It is to be appreciated that any suitable fluid can be utilized.

The input member 20 presents a face 26 transverse to the longitudinal axis 22, with the face 26 further defining the cavity 24. Furthermore, the input member 20 defines a hole 28 transverse to the longitudinal axis 22. The hole 28 is in fluid communication with the cavity 24 for receiving the fluid from the cavity 24. In addition, the cavity 24 is in fluid communication with the inside of the housing 16. It is to be appreciated that the hole 28 can be further defined as a plurality of holes 28 spaced from each other, with each of the holes 28 extending transverse to the longitudinal axis 22 and in fluid communication with the cavity 24.

Turning to FIG. 1, the cavity 24 of the input member 20 extends along the longitudinal axis 22 to present an inner surface 30 disposed radially relative to the longitudinal axis 22 and a base 32 disposed transverse to the longitudinal axis 22. The fluid is disposed along the inner surface 30 of the cavity 24 and the base 32 prevents the fluid from flowing further in that direction. More specifically, the inner surface 30 defines the hole 28 transverse to the longitudinal axis 22, with the hole 28 in fluid communication with the cavity 24. In one embodiment, the hole 28 is perpendicular to the longitudinal axis 22.

The input member 20 also includes an outer surface 34 spaced from the inner surface 30 transverse to the longitudinal axis 22. The outer surface 34 further defines the hole 28 such that the hole 28 extends between the inner and outer surfaces 30, 34. In other words, the inner and outer surfaces 30, 34 define the hole 28 extending therebetween. As such, the fluid flows from the inner surface 30 through the hole 28 to the outer surface 34. Generally, the hole 28 is disposed between the base 32 and the face 26. As such, the hole 28 is spaced from the base 32 and the face 26. In one embodiment, the hole 28 is disposed adjacent to the base 32. It is to be appreciated that the hole 28 can be disposed in any suitable location and orientation. Furthermore, the hole 28 can be further defined as a plurality of holes 28 as discussed above, with each of the holes 28 extending between the inner and outer surfaces 30, 34.

The inner surface 30 of the input member 20 includes a lip 36 extending toward the longitudinal axis 22 for retaining the fluid within the cavity 24. In other words, the lip 36 prevents the fluid from flowing further in that direction. Specifically, rotation of the input member 20 creates a centripetal force on the fluid in the cavity 24 which causes the fluid to abut the inner surface 30 and move through the hole 28. Hence, the fluid does not flow over the lip 36 and out of the cavity 24 at the face 26 of the input member 20 into the inside of the housing 16. Therefore, the lip 36 and the base 32 retain the fluid within the cavity 24. The lip 36 is spaced from the base 32 such that the hole 28 is disposed between the lip 36 and the base 32. In certain embodiments, the lip 36 is disposed adjacent to the face 26. It is to be appreciated that the lip 36 can be in any suitable height transverse to the longitudinal axis 22 for retaining the fluid. It is to further be appreciated that the lip 36 can be any suitable location and orientation.

The shaft assembly 14 further includes a shaft 38 disposed inside the housing 16 and rotatable about the longitudinal axis 22. Generally, the shaft 38 is disposed along the longitudinal axis 22. Furthermore, the shaft 38 and the input member 20 can commonly rotate about the longitudinal axis 22 or the shaft 38 and the input member 20 can rotate independently of each other about the longitudinal axis 22. It is to be appreciated that the shaft 38 can remain stationary while the input member 20 rotates about the longitudinal axis 22.

The shaft 38 extends to a first end 40 facing the input member 20. It is to be appreciated that the shaft 38 can extend to a second end spaced from the first end 40 along the longitudinal axis 22. The shaft 38 and the input member 20 are spaced from each other along the longitudinal axis 22 to define a gap 42 therebetween. More specifically, the face 26 faces the first end 40 of the shaft 38 such that the face 26 and the first end 40 are spaced from each other to further define the gap 42. In particular, the first end 40 is transverse to the longitudinal axis 22 such that the first end 40 faces the face 26 in a spaced relationship to define the gap 42 therebetween. In certain embodiments, the first end 40 and the face 26 are substantially parallel to each other to define the gap 42 therebetween. Therefore, having the shaft 38 and the input member 20 spaced from each other prevents friction between the shaft 38 and the input member 20 during rotation about the longitudinal axis 22; and thus reduces spinloss of the shaft 38 and the input member 20.

Furthermore, the shaft 38 defines a channel 44 along the longitudinal axis 22 to present an inner wall 46 disposed radially relative to the longitudinal axis 22. The channel 44 receives the fluid, and more specifically, the fluid flows from the channel 44 to the cavity 24 of the input member 20 as discussed further below.

Figure 3:
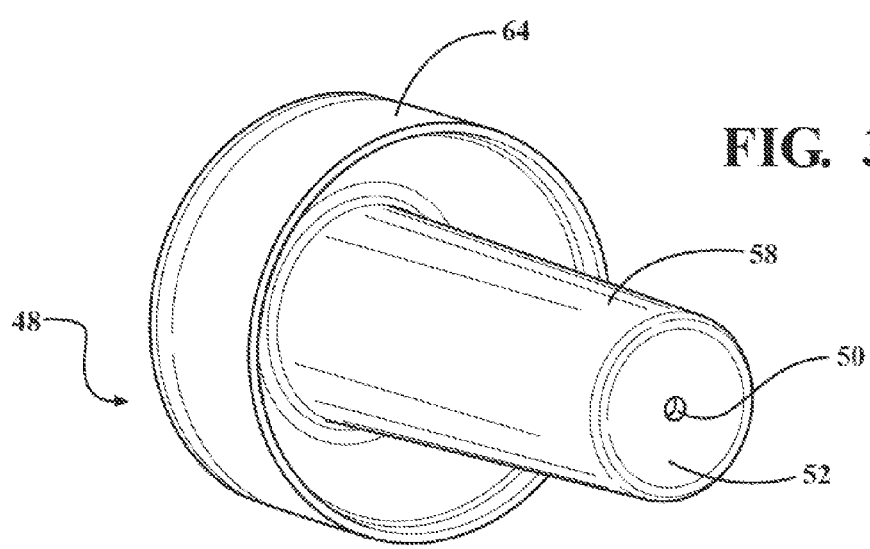
FIG. 3 is a schematic perspective view of a cap.

Turning to FIGS. 1 and 3, the shaft assembly 14 also includes a cap 48 attached to the shaft 38, with the cap 48 extending through the gap 42 into the cavity 24 of the input member 20. In other words, the cap 48 bridges the gap 42 between the shaft 38 and the input member 20 to deliver or transfer the fluid from the shaft 38 to the input member 20. In certain embodiments, the cap 48 is attached to the inner wall 46 such that the cap 48 and the shaft 38 commonly rotate about the longitudinal axis 22. It is to be appreciated that the cap 48 can be attached to the shaft 38 at any suitable location and orientation.

Generally, the cap 48 is spaced from the input member 20. Specifically, the cap 48 is spaced from the lip 36 of the input member 20, and additionally, the cap 48 is spaced from the inner surface 30 and the base 32 of the input member 20. As such, the cap 48 is partially disposed in the cavity 24 of the input member 20 without the cap 48 engaging the input member 20. Spacing the cap 48 from the input member 20 prevents friction between the cap 48 and the input member 20 during rotation about the longitudinal axis 22; and therefore reduces spinloss of the input member 20 and the cap 48, and thus the shaft 38. It is to be appreciated that the lip 36 can be any suitable height transverse to the longitudinal axis 22 such that the lip 36 is spaced from the cap 48.

The cap 48 defines an aperture 50 in fluid communication with the cavity 24 for delivering the fluid from the shaft 38 to the cavity 24 of the input member 20. Specifically, the fluid flows from the channel 44 of the shaft 38 through the aperture 50 of the cap 48 and into the cavity 24 of the input member 20. Once the fluid is in the cavity 24 of the input member 20, the fluid flows along the inner surface 30 of the cavity 24, into the hole 28, and out to the outer surface 34. In certain embodiments, the aperture 50 is disposed along the longitudinal axis 22. It is to be appreciated that the aperture 50 can be any suitable location and orientation.

Referring back to FIG. 1, generally, the cap 48 extends outwardly away from the shaft 38 to a distal end 52 such that the cap 48 extends through the gap 42 into the cavity 24 a first length 54 along the longitudinal axis 22. The first length 54 is defined between the first end 40 of the shaft 38 and the distal end 52 of the cap 48. Generally, the distal end 52 further defines the aperture 50 in fluid communication with the channel 44 of the shaft 38 and the cavity 24 of the input member 20 for delivering the fluid from the channel 44 to the cavity 24.

The cap 48 overlaps the input member 20 a second length 56 along the longitudinal axis 22. The second length 56 is defined between the face 26 of the input member 20 and the distal end 52 of the cap 48. In certain embodiments, the first length 54 greater than the second length 56. Having the distal end 52 disposed in the cavity 24 of the input member 20 allows the fluid to exit the aperture 50 within the cavity 24 such that the fluid does not flow out into the inside of the housing 16.

Also referring to FIG. 3, more specifically, the cap 48 can include a projection 58 extending through the gap 42 into the cavity 24. Therefore, the projection 58 bridges the gap 42 between the shaft 38 and the input member 20 to deliver or transfer the fluid from the shaft 38 to the input member 20. The projection 58 further defines the aperture 50 in fluid communication with the cavity 24. Generally, the channel 44 of the shaft 38 is in fluid communication with the aperture 50 of the projection 58 for delivering the fluid from the channel 44 to the cavity 24. Specifically, the projection 58 is spaced from the lip 36 of the input member 20, and additionally, the projection 58 is spaced from the inner surface 30 and the base 32 of the input member 20. It is to be appreciated that the lip 36 can be any suitable height transverse to the longitudinal axis 22 such that the lip 36 is spaced from the projection 58.

The projection 58 further defines the distal end 52 such that the projection 58 extends outwardly away from the shaft 38 to the distal end 52 disposed in the cavity 24. In other words, the projection 58 extends outwardly away from the shaft 38 through the gap 42 into the cavity 24 of the input member 20 to the distal end 52 transverse to the longitudinal axis 22. In various embodiments, the first end 40 of the shaft 38 and the distal end 52 of the projection 58 are substantially parallel to each other. Furthermore, in various embodiments, the face 26 of the input member 20 and the distal end 52 of the projection 58 are substantially parallel to each other.

Referring to FIG. 1, the projection 58 extends through the gap 42 into the cavity 24 the first length 54 along the longitudinal axis 22. The first length 54 is defined between the first end 40 of the shaft 38 and the distal end 52 of the projection 58 for delivering the fluid from the channel 44 of the shaft 38 to the inner surface 30 of the cavity 24. In addition, the projection 58 overlaps the input member 20 the second length 56 along the longitudinal axis 22. The second length 56 is defined between the face 26 of the input member 20 and the distal end 52 of the projection 58 for delivering the fluid to the inner surface 30 of the cavity 24. In certain embodiments, the first length 54 is greater than the second length 56.

The inner surface 30 of the cavity 24 defines a total length 60 between the face 26 and the base 32 of the input member 20. In certain embodiments, the total length 60 is greater than the first length 54. In addition, in certain embodiments, the total length 60 is greater than the second length 56. It is to be appreciated that the cap 48/projection 58 can extend into the cavity 24 any suitable length.

In certain embodiments, the cap 48, and more specifically, the projection 58, defines a passageway 62 to the distal end 52. The passageway 62 is in fluid communication with the channel 44 of the shaft 38 and the aperture 50 of the distal end 52 of the cap 48/projection 58. Therefore, the fluid flows from the channel 44 of the shaft 38, through the passageway 62, out the aperture 50 of the distal end 52, and into the cavity 24 of the input member 20. Generally, the passageway 62 is disposed along the longitudinal axis 22. In certain embodiments, the channel 44, the passageway 62, the aperture 50, and the cavity 24 are coplanar with each other relative to the longitudinal axis 22. In other embodiments, the channel 44, the passageway 62, the aperture 50, and the cavity 24 are coaxial with each other relative to the longitudinal axis 22. It is to be appreciated that the channel 44, the passageway 62, the aperture 50, and the cavity 24 can be in any suitable location and orientation cooperating with each other.

Turning to FIGS. 1 and 3, the cap 48 further includes a periphery 64 attached to the shaft 38. In certain embodiments, the periphery 64 is attached to the inner wall 46. In one embodiment, the periphery 64 is attached to the shaft 38 by a press fit. It is to be appreciated that the cap 48 can be attached to the shaft 38 by adhesive, welding, fasteners, and/or any other suitable methods. It is to further be appreciated, as mentioned above, that the cap 48 can be attached to the shaft 38 at any suitable location and orientation. Generally, the periphery 64 surrounds the projection 58 such that the projection 58 is spaced from the periphery 64. In certain embodiments, the projection 58 and the periphery 64 are integrally formed to each other. Simply stated, in certain embodiments, the cap 48 is formed as a single component.

Referring to FIG. 1, the shaft assembly 14 can further include a bearing device 66 coupled to the input member 20. Furthermore, the bearing device 66 is coupled to the housing 16. Therefore, a portion of the bearing device 66 commonly rotates with the input member 20 about the longitudinal axis 22 and another portion of the bearing device 66 remains stationary with the housing 16 as discussed further below. The bearing device 66 is in fluid communication with the hole 28 for receiving the fluid from the hole 28 to lubricate the bearing device 66. In other words, the fluid is delivered or transferred to the bearing device 66 through the hole 28 to lubricate the features/components of the bearing device 66.

Generally, the bearing device 66 abuts the outer surface 34 adjacent to the hole 28. The bearing device 66 is also coupled to the housing 16. More specifically, the bearing device 66 can include a sleeve 68 coupled or attached to the outer surface 34 of the input member 20 and the housing 16. Specifically, the sleeve 68 can include an inner race 70 abutting the outer surface 34 of the input member 20 and an outer race 72 abutting the housing 16. It is to be appreciated that the inner and outer races 70, 72 can be coupled or attached to the input member 20 and the housing 16 respectively by any suitable methods. It is to further be appreciated that the sleeve 68 can be commonly referred to as a race way.

The bearing device 66 can also include a plurality of rollers 74 disposed in the sleeve 68. More specifically, the rollers 74 are disposed between the inner and outer races 70, 72 such that one of the inner and outer races 70, 72 rotate independently of an other one of the inner and outer races 70, 72. For example, in one embodiment, the inner race 70 commonly rotates with the input member 20 about the longitudinal axis 22 while the outer race 72 remains stationary with the housing 16 as the inner race 70 rotates. The rollers 74 rotate between the inner and outer races 70, 72 to allow independent rotation of the inner and outer races 70, 72. As such, the fluid is transferred or delivered to the rollers 74 and the inner and outer races 70, 72 to lubricate these components. Rotation of the input member 20 creates a centripetal force on the fluid in the cavity 24 which causes the fluid to abut the inner surface 30, move through the hole 28 out to the outer surface 34, and move into the bearing device 66 to lubricate the rollers 74 and the inner and outer races 70, 72. It is to be appreciated that the bearing device 66 can include other features/components not specifically recited herein. In addition, it is to be appreciated that the fluid can lubricate other features/components of the bearing device 66 and/or the fluid can lubricate features/components other than the bearing device 66.

While the best modes for carrying out the disclosure have been described in detail, those familiar with the art to which this disclosure relates will recognize various alternative designs and embodiments for practicing the disclosure within the scope of the appended claims.

The invention claimed is:

1. A shaft assembly for transferring a fluid in a transmission of a vehicle, the assembly comprising:
   an input member rotatable about a longitudinal axis, with the input member defining a cavity along the longitudinal axis;
   a shaft selectively rotatable about the longitudinal axis independently of the input member and extending to a first end facing the input member, with the shaft and the input member spaced from each other along the longitudinal axis to define a gap therebetween; and
   a cap attached to the shaft and extending through the gap into the cavity of the input member, with the cap defining an aperture in fluid communication with the cavity for delivering the fluid from the shaft to the cavity of the input member.

2. An assembly as set forth in claim 1 wherein the input member presents a face transverse to the longitudinal axis and further defining the cavity, the face faces the first end of the shaft such that the face and the first end are spaced from each other to further define the gap, the cap includes a projection extending through the gap into the cavity, and the projection further defines the aperture in fluid communication with the cavity.

3. An assembly as set forth in claim 2 wherein the shaft defines a channel along the longitudinal axis to present an inner wall disposed radially relative to the longitudinal axis, with the cap attached to the inner wall such that the cap and the shaft commonly rotate about the longitudinal axis, with the channel of the shaft in fluid communication with the aperture of the projection for delivering the fluid from the channel to the cavity.

4. An assembly as set forth in claim 2 wherein the projection extends outwardly away from the shaft to a distal end disposed in the cavity, the distal end further defines the aperture, and the aperture is disposed along the longitudinal axis.

5. An assembly as set forth in claim 4 wherein the projection extends through the gap into the cavity a first length along the longitudinal axis, with the first length defined between the first end of the shaft and the distal end of the projection, and the projection overlaps the input member a second length along the longitudinal axis, with the second length defined between the face of the input member and the distal end of the projection, with the first length greater than the second length.

6. An assembly as set forth in claim 1 wherein the cavity of the input member extends along the longitudinal axis to present an inner surface disposed radially relative to the longitudinal axis and a base disposed transverse to the longitudinal axis, with the inner surface defining a hole transverse to the longitudinal axis and in fluid communication with the cavity.

7. An assembly as set forth in claim 6 wherein the inner surface of the input member includes a lip extending toward the longitudinal axis for retaining the fluid within the cavity, with the lip being spaced from the cap and the base such that the hole is disposed between the lip and the base.

8. An assembly as set forth in claim 7 wherein the input member presents a face transverse to the longitudinal axis and facing the first end of the shaft, with the face further defining the cavity and the lip disposed adjacent to the face.

9. An assembly as set forth in claim 6 further including a bearing device coupled to the input member and in fluid communication with the hole for receiving the fluid from the hole to lubricate the bearing device.

10. An assembly as set forth in claim 9 wherein the input member includes an outer surface spaced from the inner surface transverse to the longitudinal axis, with the outer surface further defining the hole such that the hole extends between the inner and outer surfaces, with the bearing device abutting the outer surface adjacent to the hole.

11. An assembly as set forth in claim 6 wherein the input member presents a face transverse to the longitudinal axis and further defining the cavity, the face faces the first end of the shaft such that the face and the first end are spaced from each other to further define the gap, with the cap extending outwardly away from the shaft to a distal end such that the cap extends through the gap into the cavity a first length along the longitudinal axis, with the first length defined between the first end of the shaft and the distal end of the cap, and the cap overlaps the input member a second length along the longitudinal axis, with the second length defined between the face of the input member and the distal end of the cap, with the first length greater than the second length.

12. An assembly as set forth in claim 11 wherein the inner surface of the cavity defines a total length between the face and the base of the input member such that the total length is greater than the first length, and the total length is greater than the second length.

13. An assembly as set forth in claim 1 wherein said input member defines a hole transverse to the longitudinal axis and in fluid communication with the cavity for receiving the fluid from the cavity.

14. An assembly as set forth in claim 13 wherein the cavity extends along the longitudinal axis to present an inner surface disposed radially relative to the longitudinal axis and a base disposed transverse to the longitudinal axis, with the cap being spaced from the inner surface and the base, with the input member including an outer surface spaced from the inner surface transverse to the longitudinal axis, with the inner and outer surfaces further defining the hole extending therebetween, and further including a bearing device abutting the outer surface adjacent to the hole, with the bearing device in fluid communication with the hole for receiving the fluid from the hole to lubricate the bearing device.

15. A transmission for a vehicle including an engine, with the transmission configured to transfer a fluid, the transmission comprising:
   a housing;
   an input member partially disposed inside the housing and adapted to be coupled to the engine, with the input member rotatable about a longitudinal axis and defining a cavity along the longitudinal axis;
   a shaft disposed inside the housing and selectively rotatable about the longitudinal axis independently of the input member, with the shaft extending to a first end facing the input member, with the shaft and the input member spaced from each other along the longitudinal axis to define a gap therebetween; and a cap attached to the shaft and extending through the gap into the cavity of the input member, with the cap defining an aperture in fluid communication with the cavity for delivering the fluid from the shaft to the cavity of the input member.

16. A transmission as set forth in claim 15 wherein the input member presents a face further defining the cavity, the face faces the first end of the shaft such that the face and the first end are spaced from each other to further define the gap, the cap includes a projection extending through the gap into the cavity, and the projection further defines the aperture in fluid communication with the cavity.

17. A transmission as set forth in claim 16 wherein the shaft defines a channel along the longitudinal axis to present an inner wall disposed radially relative to the longitudinal axis, with the cap attached to the inner wall such that the cap and the shaft commonly rotate about the longitudinal axis, with the channel of the shaft in fluid communication with the aperture of the projection for delivering the fluid from the channel to the cavity.

18. A transmission as set forth in claim 15 wherein the cavity extends along the longitudinal axis to present an inner surface disposed radially relative to the longitudinal axis and a base disposed transverse to the longitudinal axis, with the cap being spaced from the inner surface and the base, with the input member including an outer surface spaced from the inner surface transverse to the longitudinal axis, with the inner and outer surfaces defining a hole extending therebetween, and further including a bearing device abutting the outer surface adjacent to the hole, with the bearing device in fluid communication with the hole for receiving the fluid from the hole to lubricate the bearing device.

19. A transmission as set forth in claim 18 wherein the inner surface of the input member includes a lip extending toward the longitudinal axis for retaining the fluid within the cavity, with the lip being spaced from the cap and the base such that the hole is disposed between the lip and the base.

20. A transmission for a vehicle including an engine, with the transmission configured to transfer a fluid, the transmission comprising:
a housing;
an input member partially disposed inside the housing and adapted to be coupled to the engine, with the input member rotatable about a longitudinal axis, with the input member presenting a face transverse to the longitudinal axis and defining a cavity along the longitudinal axis to present an inner surface disposed radially relative to the longitudinal axis and a base disposed transverse to the longitudinal axis;
a shaft disposed inside the housing and selectively rotatable about the longitudinal axis independently of the input member, with the shaft extending to a first end transverse to the longitudinal axis such that the first end faces the face in a spaced relationship to define a gap therebetween, with the shaft defining a channel along the longitudinal axis to present an inner wall disposed radially relative to the longitudinal axis; and
a cap attached to the inner wall of the shaft such that the cap and the shaft commonly rotate about the longitudinal axis, with the cap including a projection extending outwardly away from the shaft through the gap into the cavity of the input member to a distal end transverse to the longitudinal axis, with the distal end defining an aperture in fluid communication with the channel of the shaft and the cavity of the input member for delivering the fluid from the channel to the cavity;
wherein the first end of the shaft and the distal end of the projection are substantially parallel to each other, with the projection extending through the gap into the cavity a first length along the longitudinal axis, with the first length defined between the first end of the shaft and the distal end of the projection for delivering the fluid from the channel of the shaft to the inner surface of the cavity;
wherein the face of the input member and the distal end of the projection are substantially parallel to each other, with the projection overlapping the input member a second length along the longitudinal axis, with the second length defined between the face of the input member and the distal end of the projection for delivering the fluid to the inner surface of the cavity, with the first length greater than the second length.

* * * * *